United States Patent
Qiu et al.

(10) Patent No.: US 12,477,584 B2
(45) Date of Patent: Nov. 18, 2025

(54) TRANSMISSION OF PREAMBLE AND PAYLOAD MESSAGES IN RANDOM ACCESS PROCEDURES

(71) Applicant: ZTE CORPORATION, Guangdong (CN)

(72) Inventors: Zhihong Qiu, Shenzhen (CN); He Huang, Shenzhen (CN); Eswar Kalyan Vutukuri, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 350 days.

(21) Appl. No.: 17/887,040

(22) Filed: Aug. 12, 2022

(65) Prior Publication Data

US 2022/0386385 A1    Dec. 1, 2022

Related U.S. Application Data

(63) Continuation of application No. PCT/CN2020/075093, filed on Feb. 13, 2020.

(51) Int. Cl.
*H04W 72/04* (2023.01)
*H04W 74/0833* (2024.01)
*H04W 74/0836* (2024.01)
*H04W 74/0838* (2024.01)

(52) U.S. Cl.
CPC .... *H04W 74/0833* (2013.01); *H04W 74/0836* (2024.01); *H04W 74/0838* (2024.01)

(58) Field of Classification Search
CPC ......... H04W 74/0833; H04W 74/0836; H04W 74/004; H04W 74/006; H04W 74/0838; H04W 72/23; H04L 1/1819; H04L 1/1874
See application file for complete search history.

(56) References Cited

U.S. PATENT DOCUMENTS

| | | | | |
|---|---|---|---|---|
| 11,395,332 | B2 * | 7/2022 | Choe | H04W 74/0833 |
| 12,101,672 | B2 * | 9/2024 | Park | H04W 36/0077 |
| 12,295,043 | B2 * | 5/2025 | Zhang | H04W 76/10 |
| 2007/0259665 | A1 * | 11/2007 | Chiu | H04L 1/1671 |
| | | | | 455/436 |

(Continued)

FOREIGN PATENT DOCUMENTS

| | | |
|---|---|---|
| CN | 104885550 A | 9/2015 |
| CN | 110536475 A | 12/2019 |

(Continued)

OTHER PUBLICATIONS

Apple, "2-step CFRA," 3GPP TSG-RAN WG2 Meeting #108; R2-1915929; Nov. 18-22, 2019; Reno, Nevada, US (4 pages).

(Continued)

*Primary Examiner* — Mahbubul Bar Chowdhury
(74) *Attorney, Agent, or Firm* — Foley & Lardner LLP

(57) ABSTRACT

Presented are systems and methods for transmission of preamble and payload messages in random access procedures. A wireless communication device may transmit, in a random access (RA) procedure, a RA preamble and a corresponding uplink channel payload to a wireless communication node. The wireless communication device may retransmit, to the wireless communication node, the corresponding uplink channel payload through an uplink grant, responsive to a failure of the transmitted uplink channel payload for the wireless communication node.

15 Claims, 8 Drawing Sheets

(56) References Cited

U.S. PATENT DOCUMENTS

| | | | |
|---|---|---|---|
| 2010/0074202 A1* | 3/2010 | Park | H04W 72/23 370/329 |
| 2010/0169733 A1* | 7/2010 | Kim | H04L 1/1864 714/E11.131 |
| 2011/0261763 A1* | 10/2011 | Chun | H04W 74/002 370/329 |
| 2017/0013610 A1* | 1/2017 | Lee | H04W 72/21 |
| 2018/0279375 A1 | 9/2018 | Jeon et al. | |
| 2019/0132882 A1 | 5/2019 | Li et al. | |
| 2019/0320467 A1 | 10/2019 | Freda et al. | |
| 2020/0107370 A1* | 4/2020 | Wei | H04W 72/23 |
| 2020/0252973 A1* | 8/2020 | Zhang | H04W 76/18 |
| 2020/0260500 A1* | 8/2020 | Agiwal | H04W 74/006 |
| 2021/0144769 A1* | 5/2021 | Wei | H04L 1/1854 |
| 2022/0007399 A1* | 1/2022 | Rastegardoost | H04L 5/0055 |
| 2022/0272769 A1* | 8/2022 | Lei | H04W 74/0866 |
| 2022/0304075 A1* | 9/2022 | Lin | H04W 74/0833 |

FOREIGN PATENT DOCUMENTS

| | | |
|---|---|---|
| CN | 113303020 A | 8/2021 |
| EP | 3 881 633 B1 | 12/2023 |
| JP | 2012-530434 A | 11/2012 |
| WO | WO-2020/020030 A1 | 1/2020 |

OTHER PUBLICATIONS

Ericsson, "RA type switch and fallback in 2-step RA," 3GPP TSG-RAN WG2 #108; R2-1915602; Nov. 18-22, 2019; Reno, Nevada, USA (6 pages).

Notice of Reasons for Rejection on JP App. No. 2022-548908 dated Sep. 26, 2023 (with English translation, 9 pages).

Communication pursuant to Article 94(3) EPC for EP Appl. No. 20888143.3, dated Jun. 26, 2024 (7 pages).

International Search Report and Written Opinion for PCT Appl. No. PCT/CN2020/075093 mailed Nov. 17, 2020. (8 Pages).

ZTE Corporation et al.: "Draft MAC CR for 2-step CFRA" 3GPP TSG-RAN WG2 Meeting #108 R2-1915268 Nov. 22, 2019(Nov. 22, 2019) Reno, USA (39 pages).

ZTE Corporation et al.: "Msg2 payload contents for 2-step RACH" 3GPP TSG-RAN WG2 Meeting#104 R2-1817064 Nov. 16, 2018(Nov. 16, 2018) Spokane, USA (9 pages).

Extended European Search Report on EP Appl. No. 20888143.3 dated Sep. 8, 2023 (12 pages).

First Office Action for CN Appl. No. 202080093481.9, dated Apr. 14, 2025 (with English translation, 16 pages).

Office Action for KR Appl. No. 10-2022-7027975, dated Apr. 25, 2025 (with English translation, 9 pages).

* cited by examiner

TRANSMISSION OF PREAMBLE AND PAYLOAD MESSAGES IN RANDOM ACCESS PROCEDURES

CROSS-REFERENCE TO RELATED APPLICATION

This application claims the benefit of priority under 35 U.S.C. § 120 as a continuation of PCT Patent Application No. PCT/CN2020/075093, filed on Feb. 13, 2020, the disclosure of which is incorporated herein by reference in its entirety.

TECHNICAL FIELD

The disclosure relates generally to wireless communications, including but not limited to systems and methods for transmission of preamble and payload messages in random access procedures.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may transmit, in a random access (RA) procedure, a RA preamble and a corresponding uplink channel payload to a wireless communication node. The wireless communication device may retransmit, to the wireless communication node, the corresponding uplink channel payload through an uplink grant, responsive to a failure of the transmitted uplink channel payload for the wireless communication node.

In some embodiments, the wireless communication device from the wireless communication node may receive a fallback RA response (RAR) including the uplink grant. The RA procedure may include a contention free RA (CFRA) procedure.

In some embodiments, the wireless communication device may establish a medium access control (MAC) protocol data unit (PDU) based on a MsgA buffer. The corresponding uplink channel payload may be based on the MsgA buffer. In some embodiments, the wireless communication device may re-transmit to the wireless communication node. The corresponding uplink channel payload may use the MAC PDU.

In some embodiments, the wireless communication device may retransmit, to the wireless communication node, the corresponding uplink channel payload only once. The uplink grant may be from a fallback RA response (RAR).

In some embodiments, the wireless communication device may retransmit, to the wireless communication node, the corresponding uplink channel payload through the uplink grant. The scheduling of uplink channel payload based on the uplink grant may correspond to a new data indicator (NDI) with an initial NDI value. The uplink grant may be from a fallback RA response (RAR). In some embodiments, the wireless communication device may receive, from the wireless communication node, a downlink channel addressed to a cell radio network temporary identifier (C-RNTI). The C-RNTI may include a current NDI value. The wireless communication device may retransmit, responsive to a failure of the retransmitted uplink channel payload for the wireless communication node, the corresponding uplink channel payload according to whether the current NDI value differs from the initial NDI value (or the previous NDI value) of the same HARQ process that is scheduled.

In some embodiments, when the current NDI value matches the initial NDI value (or the previous NDI value) of the same HARQ process that is scheduled, the wireless communication device may retransmit the corresponding uplink channel payload that is buffered in a buffer of the corresponding hybrid automatic repeat request (HARQ) process. In some embodiments, when the current NDI value differs from the initial NDI value (or the previous NDI value) of the same HARQ process that is scheduled, the wireless communication device may initiate a transmission based on a new scheduling of the corresponding hybrid automatic repeat request (HARQ) process. In some embodiments, the NDI may be set according to protocol.

In some embodiments, the wireless communication device may maintain or keep a hybrid automatic repeat request (HARQ) buffer from the transmitting of the RA preamble and the corresponding uplink channel payload. The HARQ buffer may include a medium access control (MAC) protocol data unit (PDU). In some embodiments, the transmitting of the RA preamble and the corresponding uplink channel payload may be the last random access attempt and may be made using CFRA resources. In some embodiments, the wireless communication device may retransmit, to the wireless communication node, the corresponding uplink channel payload in the MAC PDU. In some embodiments, the wireless communication device may retransmit, to the wireless communication node, the corresponding uplink channel payload using a redundant version (RV). The RV may be indicated in a fallback RA response (RAR).

In some embodiments, the wireless communication device may retransmit, to the wireless communication node corresponding to a new data indicator (NDI) with an initial value, the corresponding uplink channel payload in the MAC PDU. In some embodiments, the wireless communication device may retransmit, responsive to a failure of the retransmitted uplink channel payload for the wireless communication node, the corresponding uplink channel payload according to whether the NDI has changed in value relative to the initial value.

In some embodiments, the wireless communication device may retransmit, responsive to the failure of the retransmitted uplink channel payload for the wireless communication node, the corresponding uplink channel payload through an uplink grant of a downlink channel addressed to a cell radio network temporary identifier (C-RNTI). In some embodiments, when the NDI is unchanged in value relative to the initial value (or the previous NDI value) of the same HARQ process that is scheduled, the wireless communication device may retransmit the corresponding uplink channel payload that is buffered in a buffer of the corresponding hybrid automatic repeat request (HARQ) process. In some embodiments, when the NDI is changed in value relative to the initial value (or the previous NDI value) of the same HARQ process that is scheduled, the wireless communication device may initiate a transmission based on the new scheduling of the corresponding hybrid automatic repeat request (HARQ) process. In some embodiments, the NDI may be set according to protocol.

In some embodiments, the wireless communication device may determine an NDI value as the previous new data indicator (NDI) value of a transmission of a hybrid automatic repeat request (HARQ) process occurring prior to the transmitting of the RA preamble and the corresponding uplink channel payload to the wireless communication node using the same HARQ process. In some embodiments, the wireless communication device may receive, from the wireless communication node, a downlink channel addressed to a cell radio network temporary identifier (C-RNTI). The downlink channel may include a current NDI value. In some embodiments, the wireless communication device may retransmit, responsive to a failure of the retransmitted uplink channel payload for the wireless communication node, the corresponding uplink channel payload according to whether the current NDI value differs from the previous NDI value. In some embodiments, the uplink grant may be from a downlink channel addressed to a cell radio network temporary identifier (C-RNTI).

In some embodiments, the wireless communication device corresponding to a new data indicator (NDI) with an initial value may transmit the RA preamble and the corresponding uplink channel payload to the wireless communication node. The corresponding uplink channel payload may be in the MAC PDU. In some embodiments, the wireless communication device may retransmit to the wireless communication node, responsive to the failure of the transmitted uplink channel payload for the wireless communication node, the corresponding uplink channel payload according to whether the NDI has changed in value relative to the initial value.

In some embodiments, when the NDI is unchanged in value relative to the initial value, the wireless communication device may retransmit the corresponding uplink channel payload that is buffered in a buffer of hybrid automatic repeat request (HARQ) process. In some embodiments, the wireless communication device may maintain a HARQ buffer from the transmitting of the RA preamble and the corresponding uplink channel payload. The HARQ buffer may include a medium access control (MAC) protocol data unit (PDU). The wireless communication device may retransmit, to the wireless communication node, the corresponding uplink channel payload in the MAC PDU.

In some embodiments, when the NDI is changed in value relative to the initial value, the wireless communication device may initiate a transmission based on a new scheduling of hybrid automatic repeat request (HARQ) process. In some embodiments, the NDI may be set according to protocol.

In some embodiments, the wireless communication device corresponding to a new data indicator (NDI) with an initial value may transmit the RA preamble and the corresponding uplink channel payload to the wireless communication node. The corresponding uplink channel payload may be in the MAC PDU. In some embodiments, responsive to receiving an uplink grant addressed to the C-RNTI, and to the RA procedure being a contention free RA (CFRA) procedure, the wireless communication device may retransmit the corresponding uplink channel payload according to whether the NDI has changed in value relative to the initial value.

At least one aspect is directed to a system, method, apparatus, or a computer-readable medium. A wireless communication node in a random access (RA) procedure may receive a RA preamble and a corresponding uplink channel payload from a wireless communication device. The wireless communication node may re-receive, from the wireless communication device, the corresponding uplink channel payload through an uplink grant, responsive to a failure of the transmitted uplink channel payload for the wireless communication node.

In some embodiments, the wireless communication node may transmit, to the wireless communication device, a fallback RA response (RAR) including the uplink grant. The RA procedure may include a contention free RA (CFRA) procedure. In some embodiments, the wireless communication node may cause the wireless communication device to establish a medium access control (MAC) protocol data unit (PDU) based on a MsgA buffer. The corresponding uplink channel payload may be based on the MsgA buffer. In some embodiments, the wireless communication node may re-receive, from the wireless communication device, the corresponding uplink channel payload using the MAC PDU. In some embodiments, the wireless communication node may re-receive, from the wireless communication device, the corresponding uplink channel payload only once. The uplink grant may be from a fallback RA response (RAR).

In some embodiments, the wireless communication node may re-receive, from the wireless communication device, the corresponding uplink channel payload through the uplink grant. The scheduling of the uplink channel payload based on the uplink grant may correspond to a new data indicator (NDI) with an initial NDI value. The uplink grant may be from a fallback RA response (RAR). In some embodiments, the wireless communication node may transmit, to the wireless communication device, a downlink channel addressed to a cell radio network temporary identifier (C-RNTI). The downlink channel may include a current NDI value. The wireless communication node may re-receive, responsive to a failure of the retransmitted uplink channel payload for the wireless communication node, from the wireless communication device, the corresponding uplink channel payload according to whether the current NDI value differs from the initial NDI value (or the previous NDI value) of the same HARQ process that is scheduled.

In some embodiments, when the current NDI value matches the initial NDI value (or the previous NDI value) of the same HARQ process that is scheduled, the wireless communication node may re-receive, from the wireless communication device, the corresponding uplink channel payload that is buffered in a buffer of the corresponding hybrid automatic repeat request (HARQ) process. In some embodiments, when the current NDI value differs from the initial NDI value (or the previous NDI value) of the same HARQ process that is scheduled, the wireless communication node may cause the wireless communication device to initiate a transmission based on a new scheduling of the corresponding hybrid automatic repeat request (HARQ) process. In some embodiments, the NDI may be set according to protocol.

In some embodiments, the wireless communication node may cause the wireless communication device to maintain or keep a hybrid automatic repeat request (HARQ) buffer from the transmitting of the RA preamble and the corresponding uplink channel payload. The HARQ buffer may include a medium access control (MAC) protocol data unit (PDU). In some embodiments, the transmitting of the RA preamble and the corresponding uplink channel payload may be the last random access attempt and may be made using CFRA resources. In some embodiments, the wireless communication node may re-receive, from the wireless communication device, the corresponding uplink channel payload in the MAC PDU. In some embodiments, the wireless communication node may re-receive, from the wireless communication device, the corresponding uplink channel payload using a redundant version (RV). The RV may be indicated in a fallback RA response (RAR).

In some embodiments, the wireless communication node may re-receive, from the wireless communication device, the corresponding uplink channel payload in the MAC PDU. The wireless communication node may correspond to a new data indicator (NDI) with an initial value. In some embodiments, the wireless communication node may re-receive, responsive to a failure of the retransmitted uplink channel payload for the wireless communication node, from the wireless communication device, the corresponding uplink channel payload according to whether the NDI has changed in value relative to the initial value.

In some embodiments, the wireless communication node may re-receive, responsive to the failure of the retransmitted uplink channel payload for the wireless communication node, from the wireless communication device, the corresponding uplink channel payload through an uplink grant of a downlink channel addressed to a cell radio network temporary identifier (C-RNTI).

In some embodiments, when the NDI is unchanged in value relative to the initial value, the wireless communication node may re-receive, from the wireless communication device, the corresponding uplink channel payload that is buffered in a buffer of hybrid automatic repeat request (HARQ) process.

In some embodiments, when the NDI is unchanged in value relative to the initial value, the wireless communication node may cause the wireless communication device to initiate the corresponding uplink channel payload that is buffered in a buffer of hybrid automatic repeat request (HARQ) process. In some embodiments, the NDI may be set according to protocol.

In some embodiments, the wireless communication node may re-receive, responsive to the failure of the retransmitted uplink channel payload for the wireless communication node, the corresponding uplink channel payload through an uplink grant of a downlink channel addressed to a cell radio network temporary identifier (C-RNTI). In some embodiments, when the NDI is unchanged in value relative to the initial value (or the previous NDI value) of the same HARQ process that is scheduled, the wireless communication node may re-receive the corresponding uplink channel payload that is buffered in a buffer of the corresponding hybrid automatic repeat request (HARQ) process. In some embodiments, when the NDI is changed in value relative to the initial value (or the previous NDI value) of the same HARQ process that is scheduled, the wireless communication node may cause the wireless communication device to initiate a transmission based on the new scheduling of the corresponding hybrid automatic repeat request (HARQ) process. In some embodiments, the NDI may be set according to protocol.

In some embodiments, the wireless communication node may cause the wireless communication device to determine an NDI value as the previous a new data indicator (NDI) of a transmission of a hybrid automatic repeat request (HARQ) process occurring prior to the transmitting of the RA preamble and the corresponding uplink channel payload to the wireless communication node using the same HARQ process. In some embodiments, the wireless communication node may transmit, to the wireless communication device, a downlink channel addressed to a cell radio network temporary identifier (C-RNTI). The C-RNTI may include a current NDI value. In some embodiments, the wireless communication node may re-receive, responsive to a failure of the retransmitted uplink channel payload for the wireless communication node, from the wireless communication device, the corresponding uplink channel payload according to whether the current NDI value differs from the previous NDI value. In some embodiments, the uplink grant may be from a downlink channel addressed to a cell radio network temporary identifier (C-RNTI).

In some embodiments, the wireless communication node may receive, from the wireless communication device, the RA preamble and the corresponding uplink channel payload to the wireless communication node, he corresponding uplink channel payload in the MAC PDU. The wireless communication node may correspond to a new data indicator (NDI) with an initial value. In some embodiments, the wireless communication node may re-receive, from the wireless communication device, responsive to the failure of the transmitted uplink channel payload for the wireless communication node, the corresponding uplink channel payload according to whether the NDI has changed in value relative to the initial value.

In some embodiments, when the NDI is unchanged in value relative to the initial value, the wireless communication node may re-receive, from the wireless communication device, the corresponding uplink channel payload that is buffered in a buffer of hybrid automatic repeat request (HARQ) process.

In some embodiments, the wireless communication node may cause the wireless communication device to maintain or keep a HARQ buffer from the transmitting of the RA preamble and the corresponding uplink channel payload. The HARQ buffer may include a medium access control (MAC) protocol data unit (PDU). In some embodiments, the transmitting of the RA preamble and the corresponding uplink channel payload may be the last random access attempt and may be made using CFRA resources. In some embodiments, the wireless communication device may retransmit, to the wireless communication node, the corresponding uplink channel payload in the MAC PDU.

In some embodiments, when the NDI is changed in value relative to the initial value, the wireless communication node may cause the wireless communication device to initiate a transmission based on a new scheduling of hybrid automatic repeat request (HARQ) process. In some embodiments, the NDI may be set according to protocol.

In some embodiments, the wireless communication node may receive, from the wireless communication device, the RA preamble and the corresponding uplink channel payload to the wireless communication node, the corresponding uplink channel payload in the MAC PDU. The wireless communication node may correspond to a new data indicator (NDI) with an initial value. In some embodiments, responsive to receiving an uplink grant addressed to the C-RNTI, and to the RA procedure being a contention free RA (CFRA) procedure, the wireless communication node may re-receive, from the wireless communication device, the corresponding uplink channel payload according to whether the NDI has changed in value relative to the initial value.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figure 1:
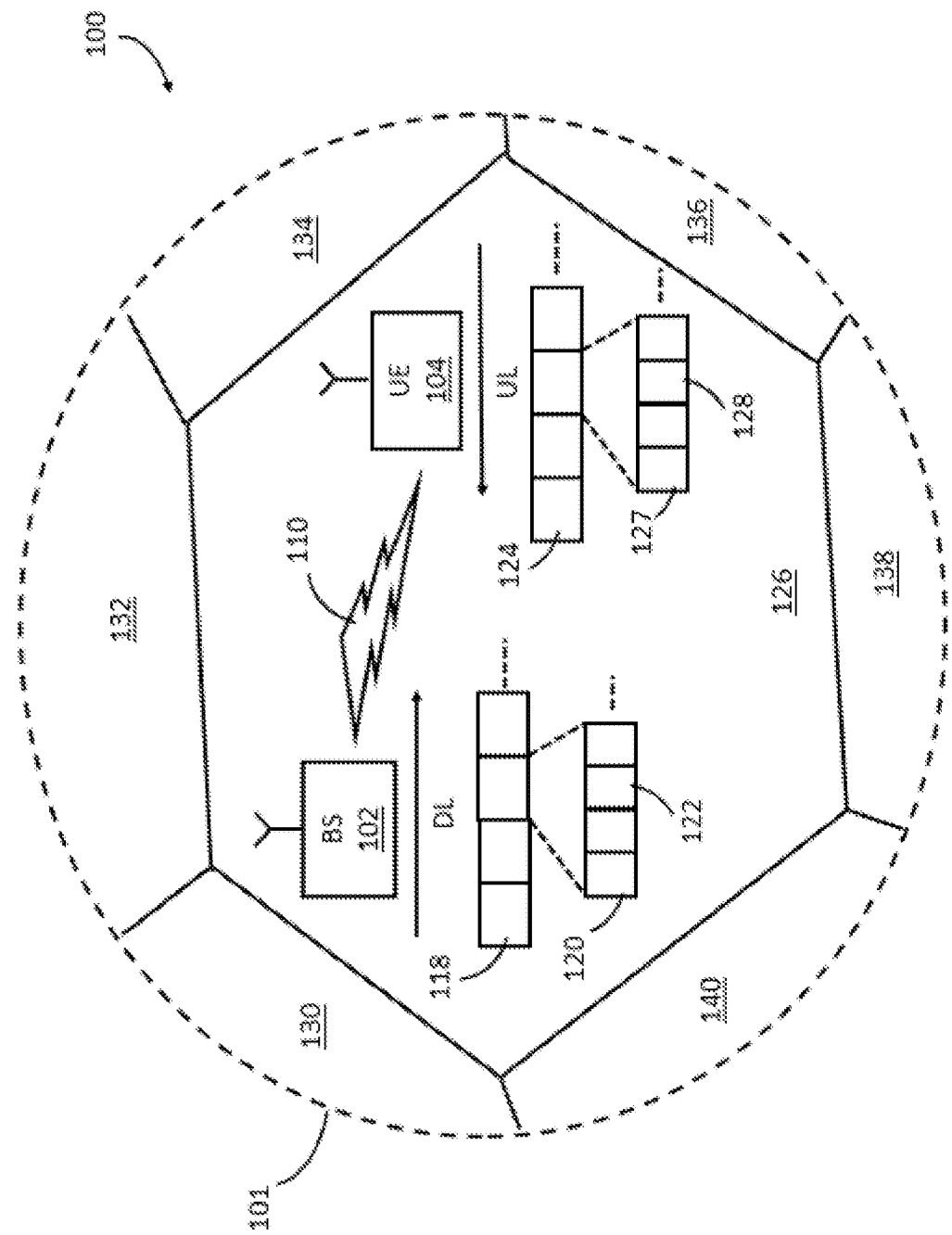
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5G gNB | Next Generation NodeB |
| 5G-GUTI | Globally Unique Temporary UE Identify |
| AF | Application Function |
| AMF | Access and Mobility Management Function |
| AN | Access Network |
| ARP | Allocation and Retention Priority |
| CA | Carrier Aggregation |
| CBRA | Contention Based Random Access |
| CFRA | Contention Free Random Access |
| CM | Connected Mode |
| CMR | Channel Measurement Resource |
| CSI | Channel State Information |
| CQI | Channel Quality Indicator |
| CSI-RS | Channel State Information Reference Signal |
| CRI | CSI-RS Resource Indicator |
| CSS | Common Search Space |
| DAI | Downlink Assignment Index |
| DCI | Downlink Control Information |
| DL | Down Link or Downlink |
| DN | Data Network |
| DNN | Data Network Name |
| ETSI | European Telecommunications Standards Institute |
| FR | Frequency range |
| GBR | Guaranteed Bit Rate |
| GFBR | Guaranteed Flow Bit Rate |
| HARQ | Hybrid Automatic Repeat Request |
| MAC-CE | Medium Access Control (MAC) Control Element (CE) |
| MCS | Modulation and Coding Scheme |
| MBR | Maximum Bit Rate |
| MFBR | Maximum Flow Bit Rate |
| NAS | Non-Access Stratum |
| NDI | New Data Indicator |
| NF | Network Function |
| NG-RAN | Next Generation Radio Access Network |
| NR | Next Generation RAN |
| NZP | Non-Zero Power |
| OFDM | Orthogonal Frequency-Division Multiplexing |
| OFDMA | Orthogonal Frequency-Division Multiple Access |
| PCF | Policy Control Function |
| PDCCH | Physical Downlink Control Channel |
| PDSCH | Physical Downlink Shared Channel |
| PDU | Packet Data Unit |
| PUCCH | Physical Uplink Control Channel |
| PUSCH | Physical Uplink Shared Channel |
| PMI | Precoding Matrix Indicator |
| PPCH | Physical Broadcast Channel |
| PRI | PUCCH resource indicator |
| QoS | Quality of Service |

-continued

| Acronym | Full Name |
|---|---|
| RA | Random Access |
| RAN | Radio Access Network |
| RAN CP | Radio Access Network Control Plane |
| RAR | Random Access Response |
| RAT | Radio Access Technology |
| RBG | Resource Block Group |
| RRC | Radio Resource Control |
| RV | Redundant Version |
| SM NAS | Session Management Non Access Stratum |
| SMF | Session Management Function |
| SRS | Sounding Reference Signal |
| SS | Synchronization Signal |
| SSB | SS/PBCH Block |
| TB | Transport Block |
| TC | Transmission Configuration |
| TCI | Transmission Configuration Indicator |
| TRP | Transmission/Reception Point |
| UCI | Uplink Control Information |
| UDM | Unified Data Management |
| UDR | Unified Data Repository |
| UE | User Equipment |
| UL | Up Link or Uplink |
| UPF | User Plane Function |
| USS | UE Specific Search Space |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
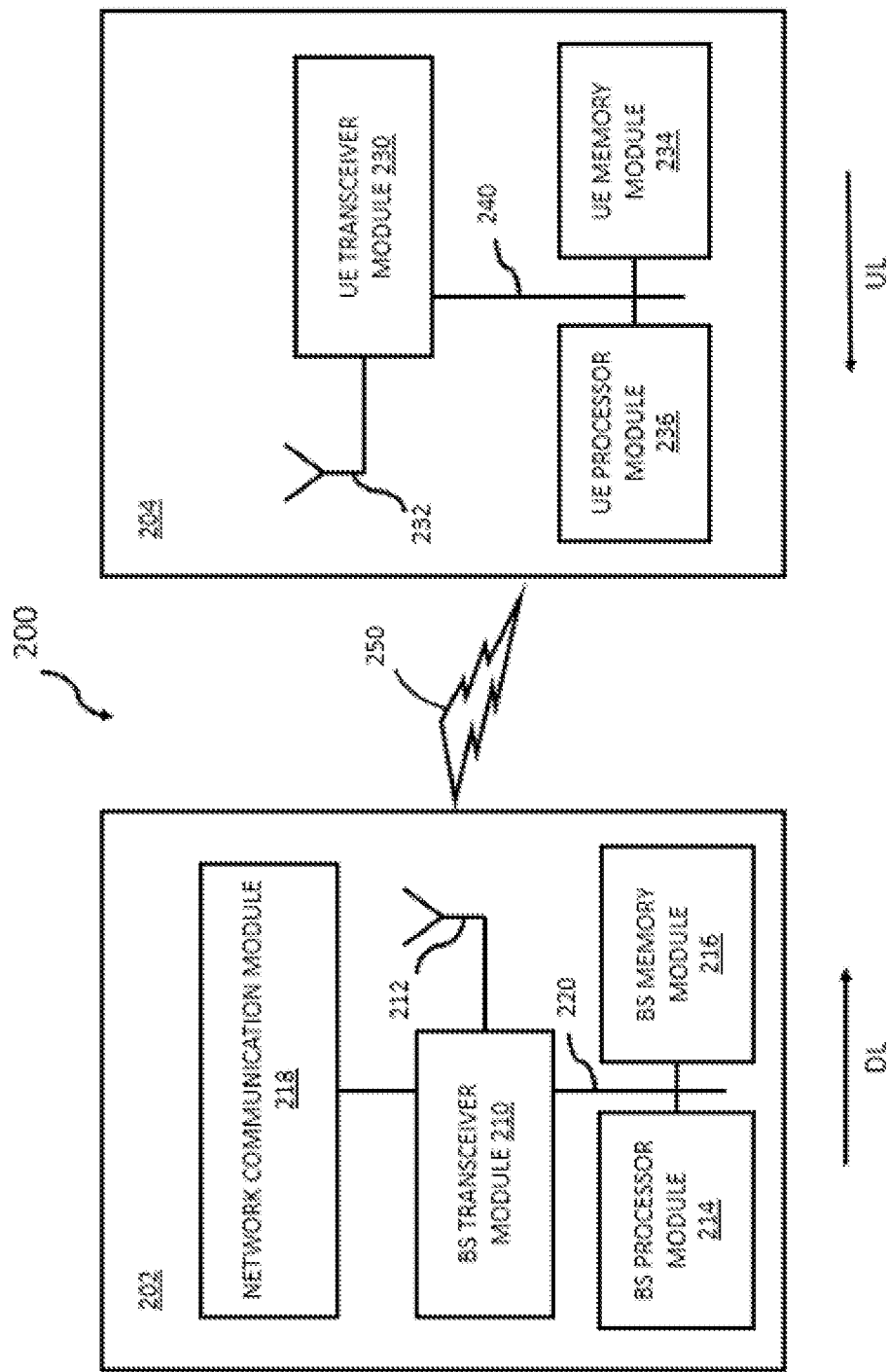
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Transmitting Preamble and Payload Messages in a Random Access Procedure The present systems and methods address how to configure and select RA preamble and physical uplinked shared channel (PUSCH) payload messages (sometimes referred herein as MsgA) transmission resource for a UE (e.g., UE 104) in different states. The states may be separate for the UE in IDLE/INACTIVE mode and for the UE in connected mode. In addition, the present systems and methods address how to handle a situation in which a network (NW) side appliance (e.g., BS 102) has successfully decode preamble but fails to receive or decode corresponding PUSCH payload in case of 2-step RA type Random Access procedure.

Figure 3A:
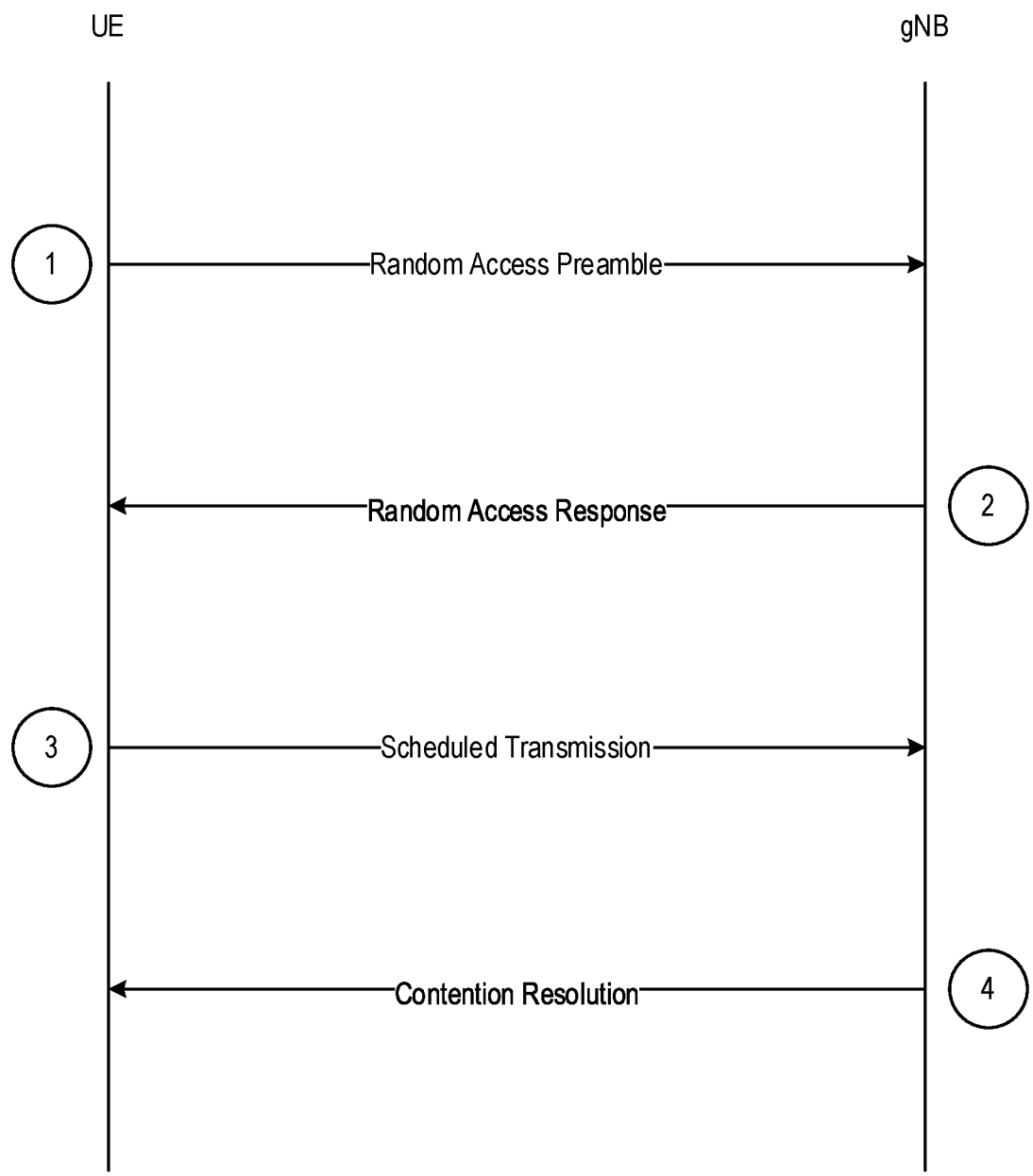
FIG. 3A illustrates a sequence diagram of an example process of a contention-based random access (CBRA) procedure with a four-step random access (RA) type, in accordance with an embodiment of the present disclosure.
Figure 3B:
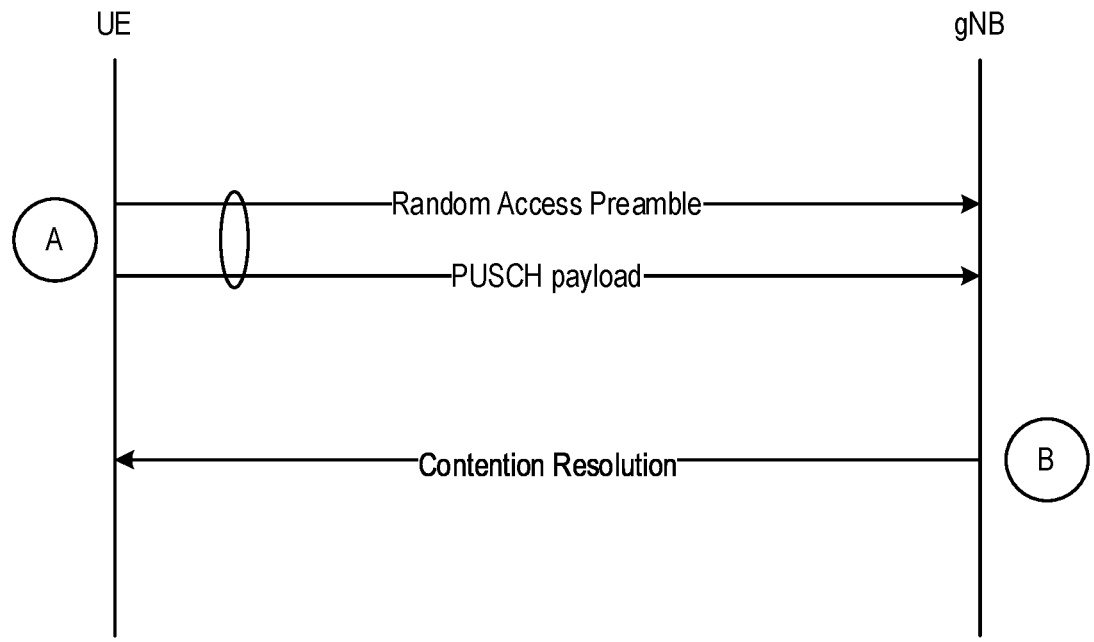
FIG. 3B illustrates a sequence diagram of a sequence diagram of an example process of a contention-based random access (CBRA) procedure with a two-step random access (RA) type, in accordance with an embodiment of the present disclosure.
Figure 3C:
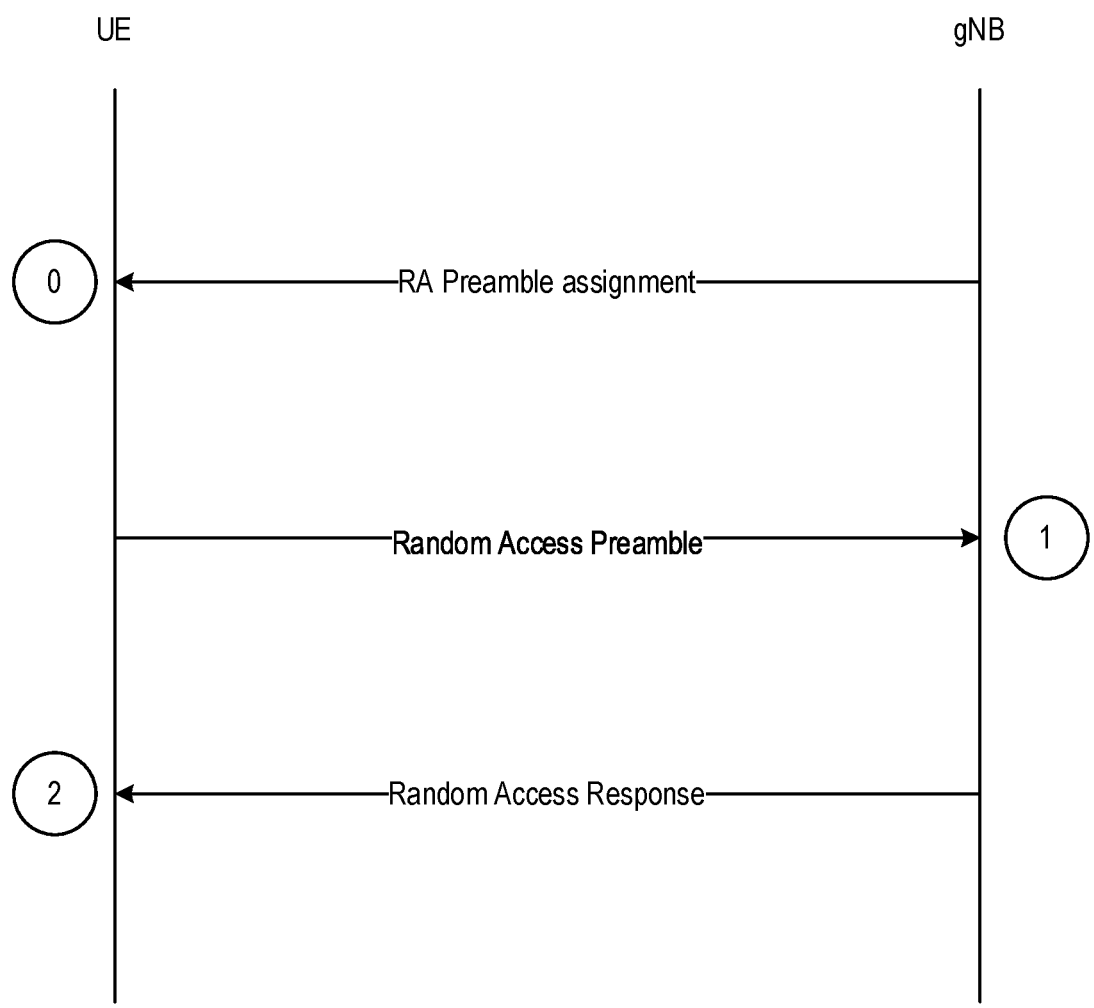
FIG. 3C illustrates a sequence diagram of a sequence diagram of an example process of a contention free random access (CFRA) procedure with a four-step random access (RA) type, in accordance with an embodiment of the present disclosure.
Figure 3D:
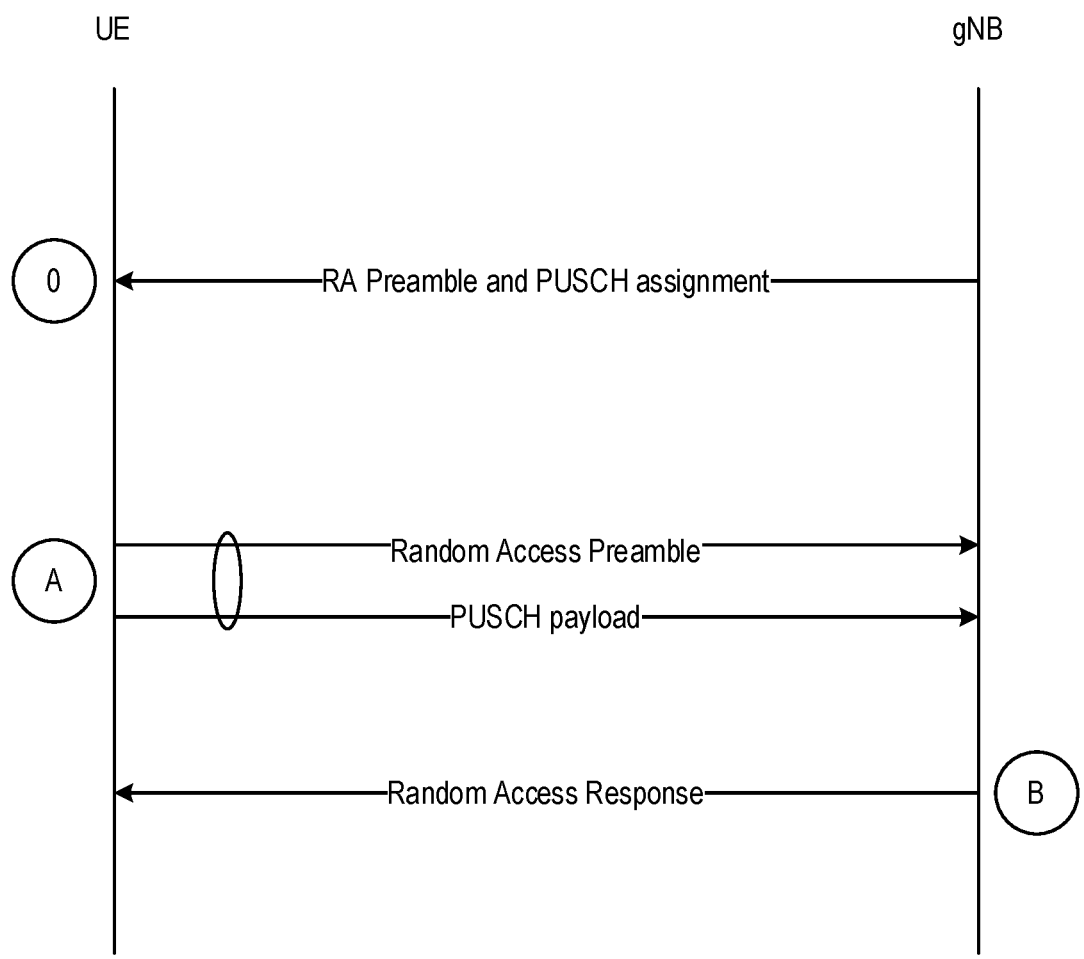
FIG. 3D illustrates a sequence diagram of a sequence diagram of an example process of a contention free random access (CFRA) procedure with a two-step random access (RA) type, in accordance with an embodiment of the present disclosure.

Under Random Access (RA) procedures, 4-step RA type and 2-step RA type may be supported. In some cases, 4-step RA type RA channel (RACH) can be referred as type 1 and a 2-step RA type RACH can be referred as type 2 RACH procedure, or vice versa. For each type of RACH procedure, both contention based RACH and contention free RACH can be applied, which in total can leads to four kind of RACH procedure, contention based RA (CBRA) with 4-step RA type (e.g., sequence 300A as depicted in FIG. 3A), contention free (CFRA) with 4-step RA type (e.g., sequence 300C as depicted in FIG. 3C), CBRA with 2-step RA type (e.g., sequence 300B as depicted in FIG. 3B), and CFRA with 2-step RA type (e.g., sequence 300D as depicted in FIG. 3D).

The general procedure for 2-step RA type Random Access procedure can be summarized as follows. First, UE may transmit a MsgA to NW side. The MsgA may include transmission of RA preamble and PUSCH payload. The UE may receive a RA response sent by NW in response to the receipt of the MsgA.

A. Selection Based on Pre-Defined Rules

The UE can receive multiple sets of RACH resource configurations for 2-step RA type RA procedure. The UE may select the 2-step RACH resource based on pre-defined rules. For each set of 2-step RACH resource may include at least one of the following:

- Preamble group configuration for 2-step RACH. For example, each 2-step RACH resource set may include two preamble groups (e.g. preamble group A and preamble group B).
- 2-step PUSCH resource for MsgA transmission. For example, the 2-step PUSCH resource may contain the parameters as specified in the protocol. For example, the time domain resource, frequency domain resource, code domain resource and other parameters as specified in the protocol (e.g., 3GPP specifications).
- The multiple set of 2-step RACH resource may further include combination of preamble resource (e.g., the preamble configuration as specified above) and PUSCH resource (e.g., the preamble configuration as specified above). For example: Multiple preamble group configuration can be provided and each preamble group can be linked to one PUSCH resource configuration; and
- the multiple sets of RACH resource configurations for 2-step RA type RA procedure may be configured from NW to UE by broadcast system information, by dedicated RRC signaling.

The configuration of 2-step CFRA resource may contain at least one of the following two parts:

Part I: Configuration of Contention-Free Preamble Resource for 2-Step CFRA.

In some embodiments, the preamble for 2-step CFRA can be reserved from either the preamble resource pool for 2-step CBRA (i.e. share the RO configuration of 2-step CBRA), or reserved from a separate preamble resource pool (i.e. have separate RO configuration of 2-step CBRA). To enable the configuration of separate preamble resource pool, a different information element (IE) (e.g. RACH-ConfigGenericTwoStepRA-r16 may be allowed) different from the one used for configuration of 2-step CBRA resource). In some embodiment, if the RACH-ConfigGenericTwoStepRA-r16 is absent for 2-step CFRA, then the configuration for 2-step CBRA will be reused.

In some embodiments, the method for the configuration of contention-free preamble for each SSB/CSI-RS in 4-step CBRA as specified in protocol can be reused for 2-step CFRA:

For SSB based 2-step CFRA:
- a RO mask index is configured, which is common for all SSB
- for each SSB, one preamble index is configured.

For CSI-RS based 2-step CFRA:
- A rsrp-ThresholdCSI-RS is configured, which is common for all CSI-RS
- for each CSI-RS, one preamble index and a list of RO are configured.

Part II: Configuration of Contention-Free PUSCH Resource for 2-Step CFRA.

In some embodiments, the PUSCH resource for 2-step CFRA can be configured in dedicated signaling. In some embodiments, the same IE used for the configuration for MsgA PUSCH resources for 2-step CBRA can be reused for the configuration of MsgA PUSCH resource for 2-step CFRA, which including at least one of the following:

- MsgA-PUSCH-Resource-r16
- msgA-TransformPrecoder-r16
- msgA-DataScramblingIndex-r16
- msgA-DeltaPreamble-r16

For the 2-step CFRA, once the PUSCH resource pool is configured, the PUSCH resource unit for each preamble reserved for each SSB/CSI-RS can be determined using various techniques.

In some embodiments, the mapping rule defined for 4-step CBRA (e.g. as specified in protocol) may be reused to determine the mapping between each preamble and the PUSCH resource unit The mapping rule between preamble and PUSCH resource unit defined in technical specification 38.213 for 4-step CBRA can be reused. With the mapping rule, each preamble reserved for CFRA may be mapped to a PUSCH resource unit. To enable this alternative, the number of preambles reserved for 2-step CFRA may be provided, and all the preambles reserved for 2-step CFRA may be considered in the mapping between preamble and PUSCH resource unit, even the preamble will not be reserved for the concerned UE. To indicate the preambles reserved for 2-step CFRA, the following parameters may be used:

- A parameter may indicate the start index of MsgA preamble, e.g., msgA-PreambleStartIndex: If N SSBs are associated with a RACH occasion, where N>=1, for the n-th SSB (i=0, . . . , N−1) the preambles start from preamble index $n \cdot N_{preamble}^{total}/N+$msgA-PreambleStartIndex are reserved for contention-free 2-step random access, where $N_{preamble}^{total}$ is provided by totalNumberOfRA-Preambles or msgA-TotalNumberOfRA-Preambles-r16; For N<1, the preambles start from preamble index msgA-PreambleStartIndex are reserved for 2-step CFRA.
- msgA-TotalNumberOfCFRA-Preambles may indicate the total number of preambles used for contention-free 2-step random access associated with each SSB in one RO.

Figure 3E:
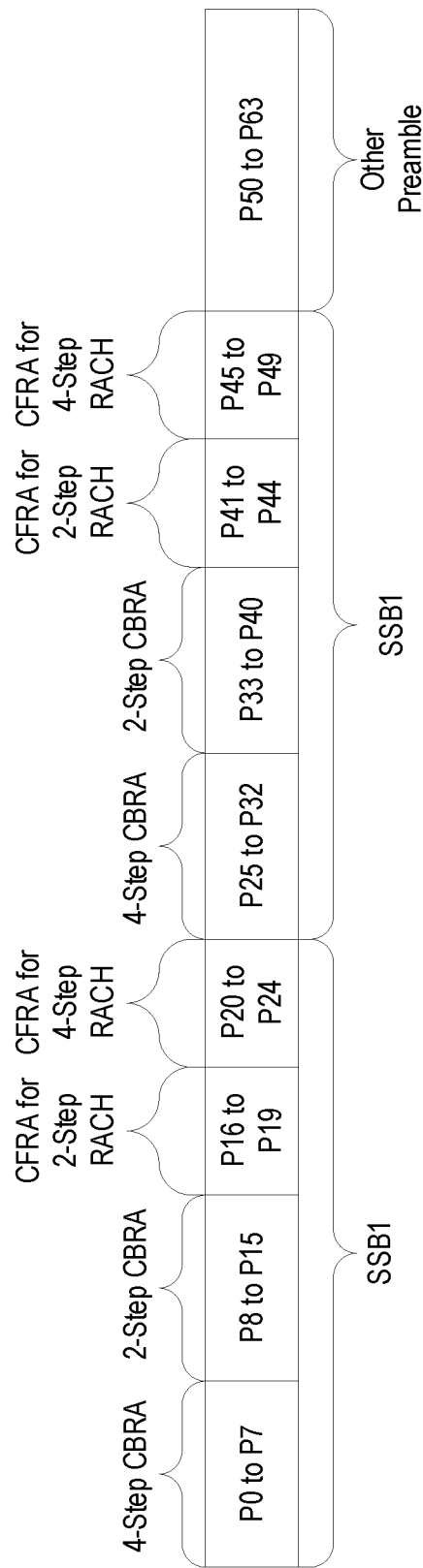
FIG. 3E illustrates a block diagram of an example allocation or distribution of random access (RA) preamble in accordance with an embodiment of the present disclosure.

As depicted in FIG. 3E, depicted is an example 300E of an abstract schematic of a preamble allocated in different SSB/CSI resources. The UE may deduct the allocation of the preamble based on the resource configuration received. The msgA-PreambleStartIndex may be set to 16, and the msgA-TotalNumberOfCFRA-Preambles may be set to 4. With these two parameters, the preambles 16-19 and preambles 41-44 may be considered as reserved for 2-step CFRA, and these preambles reserved may be mapped to the PUSCH resource unit provided by MsgA-PUSCH-Resource-r16 in signaling of a CFRA resource configuration. With the mapping between preamble and PUSCH resource unit, once a preamble may be reserved for one SSB or CSI-RS, the PUSCH resource unit mapped to the preamble may be reserved as well.

In some embodiments, the PUSCH resource unit index for each SSB/CSI-RS may be explicitly configured. A PUSCH resource unit index may be explicitly allocated for each SSB/CSI-RS. The PUSCH resource unit index may be numbered based on the same order (e.g., as defined in technical specs 38.213) for the mapping between PUSCH resource unit and preamble (e.g., first, in increasing order of frequency resource indexes; second, in increasing order of DMRS indexes within a PUSCH occasion; and third, in increasing order of time resource indexes; fourth, in increasing order of indexes for PUSCH slots). To enable this alternative, a new IE msgA-PRUIndex may be introduced and some description will be introduced in 38.213 to specify the meaning of msgA-PRUIndex.

An example on ASN.1 for configuration of CFRA resource for 2-step RA is given as follows. The information element (IE) RACH-ConfigDedicated may be used to specify the dedicated random access parameters.

RACH-ConfigDedicated

```
-- ASNI START
-- TAG-RACH-CONFIGDEDICATED-START
RACH-ConfigDedicated ::=      SEQUENCE {
    cfra              CFRA              OPTIONAL, -- Need S
    ra-Prioritization     RA-Prioritization     OPTIONAL, -- Need N
    ...,
    [[
    ra-PrioritizationTwoStep-r16 RA-Prioritization  OPTIONAL, -- Need N
    cfra-TwoStep-r16      CFRA-r16          OPTIONAL --NeedN
    ]]
}
CFRA::=          SEQUENCE {
    occasions          SEQUENCE {
        rach-ConfigGeneric    RACH-ConfigGeneric,
        ssb-perRACH-Occasion      ENUMERATED {oneEighth, oneFourth, oneHalf,
one, two, four, eight, sixteen}           OPTIONAL -- Cond SSB-CFRA
    }               OPTIONAL, -- Need S
    resources       CHOICE {
        ssb         SEQUENCE {
            ssb-ResourceList     SEQUENCE (SIZE(1..maxRA-SSB-Resources)) OF CFRA-
SSB-Resource,
            ra-ssb-OccasionMaskIndex     INTEGER (0..15)
        },
        csirs        SEQUENCE {
            csirs-ResourceList     SEQUENCE (SIZE(1..maxRA-CSIRS-Resources)) OF
CFRA-CSIRS-Resource,
            rsrp-ThresholdCSI-RS     RSRP-Range
        }
    },
    ...,
    [[
    totalNumberOfRA-Preambles INTEGER (1..63)     OPTIONAL -- Cond Occasions
    ]]
}
CFRA-r 16 : :=         SEQUENCE {
    occasionsTwoStepRA-r16     SEQUENCE {
        rach-ConfigGenericTwoStep-r16     RACH-ConfigGenericTwoStepRA-r16,
        ssb-perRACH-OccasionTwoStep-r16     ENUMERATED {oneEighth, oneFourth,
oneHalf, one, two, four, eight, sixteen}
    }               OPTIONAL, -- Need S
    msgA-PreambleStartIndex     INTEGER (0..63),
    msgA-TotalNumberOfCFRA     INTEGER (1..63),
    msgA-CFRA-PUSCH-r 16         MsgA-CFRA-PUSCH-r16,
    resources       CHOICE {
        ssb         SEQUENCE {
            ssb-ResourceList   SEQUENCE (SIZE(1..maxRA-SSB-Resources)) OF CFRA-
SSB-Resource,
            ra-ssb-OccasionMaskIndex     INTEGER (0..15)
        },
        csirs        SEQUENCE {
            csirs-ResourceList     SEQUENCE (SIZE(1..maxRA-CSIRS-Resources)) OF
CFRA-CSIRS-Resource,
            rsrp-ThresholdCSI-RS     RSRP-Range
        }
    },
    ...
}
CFRA-SSB-Resource ::=     SEQUENCE {
    ssb           SSB-Index,
    ra-PreambleIndex       INTEGER (0.. 63),
    ...
}
CFRA-CSIRS-Resource ::=     SEQUENCE {
    csi-RS         CSI-RS-Index,
    ra-OccasionList   SEQUENCE (SIZE(1..maxRA-OccasionsPerCSIRS)) OF INTEGER
(0..maxRA-Occasions-1),
    ra-PreambleIndex       INTEGER (0..63),
    ...
}
```

```
MsgA-CFRA-PUSCH-r16 ::=         SEQUENCE {
msgA-PUSCH-Resource-r16         MsgA-PUSCH-Resource-r16,
msgA-TransformPrecoder-r16      ENUMERATED {enabled}      OPTIONAL, -
- Need S
    msgA-DataScramblingIndex-r16    INTEGER (0..1023)       OPTIONAL, -- Need
S
    msgA-DeltaPreamble-r16          INTEGER (-1..6)
    OPTIONAL, -- Need S
}
-- TAG-RACH-CONFIGDEDICATED-STOP
-- ASN1STOP
```

In some embodiments, the pre-defined rules can define or specify that in the case when multiple 2-step RACH resource sets are configured, the UE is to select the 2-step RACH resource based on the trigger of RA procedure. The RA triggers may include at least one of the following:

Initial access from RRC_IDLE;
RRC Connection Re-establishment procedure;
DL or UL data arrival during RRC_CONNECTED when UL synchronisation status is "non-synchronised";
UL data arrival during RRC_CONNECTED when there are no PUCCH resources for SR available;
SR failure;
Request by RRC upon synchronous reconfiguration (e.g. handover);
Transition from RRC_INACTIVE;
To establish time alignment for a secondary TAG;
Request for Other SI (e.g., as specified in clause 7.3); and
Beam failure recovery.

The triggers alone or different combination of RA triggers can be linked to different sets of 2-step RA resource configured, and UE based on the RA trigger to select the corresponding 2 step RA resource set. For example, for the RA procedure triggered by RRC establishment, RRC re-establishment, RRC resume, the UE is to select the 2-step RACH resource set 1. For the RA procedure triggered by any other reason, the UE is to select the 2-step RACH resource set 2.

In some embodiments, the pre-defined rules may define or specify that in the case when multiple 2-step RACH resource set are configured, then UE is to select the 2-step RACH resource set based on the content of MsgA payload. For example:

If CCCH message will be included in the MsgA payload, then the 2-step RACH resource set 1 may be used. Otherwise, the 2-step RACH resource set 2 will be used.
If C-RNTI will be included in the MsgA payload, then the 2-step RACH resource set 1 may be used; otherwise, the 2-step RACH resource set 2 will be used.

In some embodiments, the pre-defined rules may define or specify that in the case when multiple 2-step RACH resource set are configured, then UE is to select the 2-step RACH resource set based on whether there is valid C-RNTI (cell radio network temporary identifier) stored for the cell. If there is valid C-RNTI stored on UE side, then the UE is to use 2-step RACH resource set 1. Otherwise, the UE is to use 2-step RACH resource set 2.

In some embodiments, the pre-defined rules may define or specify that UE is to select the 2-step RACH resource based on the presence of 2-step RACH resource for CONNECTED, or dedicated contention based 2-step RACH resources. For example, if 2-step CBRA resource is configured in BWP-UplinkDedicated for the current BWP, then the dedicated 2-step CBRA resource may be used instead of the resource configured in common resource.

In addition, different combination of above alternative can be used, or used together with the selection rules that is specified in protocol.

B. Retransmission of PUSCH Payload

The UE may retransmit MsgA PUSCH payload in case NW has successfully decode preamble but fails to receive or decode the corresponding PUSCH payload, and may take one of the following measures.

Transmission or Retransmission of MsgA PUSCH Payload through UL Grant Received in Fallback RAR In some embodiments, the UE may perform a transmission or retransmission of MsgA PUSCH payload through UL grant received in fallback Random Access Response (RAR) if the fallback RAR is received in responsive to a MsgA transmission that is made on CFRA resource. In this case, if received MsgB contains fallback RAR with the same preamble index that is transmitted in MsgA, then the UE may process the received Timing Advance Command. The UE may ignore the received TC-RNTI (temporary C-RNTI) (because it already has a C-RNTI), and may identify the RA procedure as successfully completed and stop MsgB response window. UE may retransmit the MsgA PUSCH payload according following alternatives.

a. Generating a New MAC PDU Based on MsgA Buffer

In some embodiments, for the UL grant in fallback RAR, the UE may generate a new MAC PDU based on the MsgA buffer (e.g., in the physical layer). For example, if RA is considered completion after reception of fallback RAR and CFRA resource is used for transmission of MsgA, the MsgA buffer will not be flushed right away. The UE may first generate a new MAC PDU based on the MsgA buffer. In some embodiments, the new generated MAC PDU may be put in HARQ process 0 for transmission, and may be transmitted based on the UL grant received in the fallback RAR in responsive to MsgA transmission made on CFRA resource. After the transmission of the MAC PDU in HARQ process 0, the UE may keep the HARQ buffer of HARQ process 0. In some embodiments, the new generated MAC PDU may be put in HARQ process 0. In some embodiments, the MsgA PUSCH payload may be re-transmitted by the UE once using the UL grant received in fallback RAR.

In some embodiments, considering the retransmission of PUSCH payload using UL grant indicated in fallback RAR as described above might fail again since in this case RA has already completed, the UE can retransmit the MsgA payload buffered in HARQ process 0 based on scheduling on PDCCH addressed to C-RNTI. In this case, one initial new data indicator (NDI) value (0 or 1) may be used for the MsgA PUSCH payload transmission scheduled by UL grant in fallback RAR, and UE based on whether NDI may be toggled to decide whether this is a new scheduling of HARQ process 0 (e.g., scheduling of transmission of new data) or whether to retransmit the MsgA payload stored in HARQ buffer of HARQ process 0.

The initial NDI value described above may be pre-defined in protocol or broadcasted in system information, or signaled by dedicated signaling or indicated in fallback RAR (e.g. using the bits reserved for TC-RNTI). In some embodiments, if subsequent scheduling made on PDCCH addressed to C-RNTI for HARQ process 0 is received after retransmission of MsgA PUSCH payload using the UL grant received in fallback RAR, the UE may compare the NDI value received in the PDCCH with the NDI value set for previous transmission of the same HARQ process prior to the MsgA transmission. If the NDI is toggled (e.g., different from the previous NDI value), then UE may perform new transmission of HARQ process 0 (e.g., transmission of new data in HARQ process 0) according to the scheduling configuration received in the PDCCH. Else, if the NDI is not toggled (e.g., the same as previous NDI value), UE may perform retransmission of HARQ process 0 according to the scheduling configuration received in the PDCCH.

For example, a scheduling of HARQ process 0 may be made with the NDI value set as "0", and after which the UE may initiate a 2-step RA type Random Access procedure using CFRA resource, as depicted in FIG. 3D). After transmission of MsgA if UE receives fallback RAR sent from network for scheduling MsgA PUSCH payload retransmission, the UE may transmit MsgA PUSCH payload in HARQ process 0 according to the UL grant indicated in fallback RAR. Since the transmission scheduled by UL grant in fallback RAR will not reset NDI value, then the NDI of HARQ 0 in this case is still "0". After which, if the NDI of subsequent scheduling of HARQ process 0 made on PDCCH addressed to C-RNTI is "0", the UE may compare the NDI of the subsequent scheduling with the NDI value of HARQ process 0 prior to MsgA transmission (which is 0 in this example), and the NDI is not toggled. The UE may perform retransmission of HAQR process 0 else if the NDI received is "1", meaning the NDI is toggled then UE will consider this is a scheduling of a new transmission.

b. Keeping HARQ Buffer to Use UL Grant From Fallback RAR for Retransmission of MsgA Payload In some embodiments, the HARQ buffer may be kept or maintained and the UL grant from fallback RAR may be used to process the HARQ retransmission for HARQ process 0. In some embodiments, UE may keep the HARQ buffer of HARQ process (e.g., HARQ process 0) that is used for transmission of the MAC PDU in MsgA buffer (or Msg3 buffer) after RA is completed and the last RA attempt is made on 2-step CFRA resource as described above. The UE may use the UL grant received in the fallback RAR for retransmission of MAC PDU buffered in HARQ process 0. In some embodiments, after retransmission of HARQ process 0 using the UL grant indicated in fallback RAR as described above, the UE may keep or maintain the HARQ buffer of corresponding HARQ process (e.g., HARQ process 0).

In some embodiments, if the UL grant is received in fallback RAR, and the previous MsgA transmission of the same HARQ process may be transmitted through 2-step CFRA resource, the UE may consider the NDI of the corresponding HARQ process as not toggled. Then the UE may perform the HARQ retransmission of HARQ process 0.

Furthermore, the RV version used for MsgA payload retransmission as described above can be fixed as RV0, or predefined in protocol (e.g., UE use the pre-defined RV pattern for MsgA payload retransmission scheduled by UL grant in fallback RAR and following retransmission scheduled by PDCCH addressed to C-RNTI is needed, ignoring the RV indicated in the PDCCH) or as indicated in the fallbackRAR (e.g., using the reserved bits for TC-RNTI).

In some embodiments, if subsequent retransmission of MsgA payload would be needed after HARQ retransmission of HARQ process 0 using the UL grant in fallback RAR in responsive to MsgA transmission of the last RA attempt made on CFRA resources, the UE can be scheduled with PDCCH addressed to C-RNTI. In this case, an initial NDI value (0 or 1) can be used as the NDI value of the first MsgA transmission (or of the MsgA payload retransmission scheduled by fallback RAR UL grant) for NDI comparison. The initial NDI value may be pre-defined in protocol or broadcasted in system information, or signaled by dedicated signaling or indicated in fallback RAR (e.g. using the bits reserved for TC-RNTI). For example, if fallback RAR for MsgA payload retransmission is received and UE assumes NDI of the previous MsgA transmission made on CFRA resource is "0", then the NDI of the UL grant received in fallback RAR for retransmission of MsgA payload may be "1". If following UL grant is received on PDCCH for the C-RNTI is for the same HARQ process and the NDI is "1" (e.g., NDI is not toggled), then the UE may perform the retransmission using configuration as indicated in the received PDCCH. Otherwise, if the NDI value is "0" (e.g., NDI is toggled), then the UE may perform the new HARQ transmission as specified in the protocol.

In some embodiments, if subsequent retransmission of MsgA payload is to be used after HARQ retransmission of HARQ process 0 using the UL grant in fallback RAR received in responsive to MsgA transmission of the last RA attempt made on CFRA resources as discussed above, the UE can be scheduled with PDCCH addressed to C-RNTI. For example, after retransmission of HARQ process 0 using the UL grant indicated in fallback RAR as described above, the UE may keep or maintain the HARQ buffer of HARQ process 0. And UE may receive PDCCH addressed to C-RNTI for scheduling of HARQ process 0. The UE may compare the NDI value received in first scheduling on PDCCH addressed to C-RNTI after MsgA transmission made on 2-step CFRA resource with the NDI value set for previous transmission of the same HARQ process prior to the MsgA transmission. In another words, the NDI set for HARQ process 0 prior to MsgA transmission made on CFRA resource may be used for NDI comparison of subsequent scheduling on PDCCH addressed to C-RNTI after MsgA transmission on CFRA resource or subsequent MsgA payload transmission on UL grant indicated in fallback RAR if needed. If the NDI is toggled (i.e., differ from the previous NDI value), then the UE may perform new transmission of HARQ process 0 (e.g., UE flushes HARQ process 0 buffer, and transmits new data in HARQ process 0) according to the scheduling configuration received in the PDCCH, else if the NDI is not toggled (i.e., the same as previous NDI value), the UE may perform retransmission of HARQ process 0 according to the scheduling configuration received in the PDCCH.

For example, a scheduling of HARQ process 0 may be made with the NDI value set as "0", and after which UE initiate a 2-step RA type Random Access procedure using CFRA resource. After transmission of MsgA, if the UE receives fallback RAR sent from network for scheduling MsgA PUSCH payload retransmission, the UE may transmit MsgA PUSCH payload in HARQ process 0 according to the UL grant indicated in fallback RAR. After which, if the NDI of subsequent scheduling of HARQ process 0 made on PDCCH addressed to C-RNTI is "0", the UE may compare the NDI value of the subsequent scheduling with the NDI value of HARQ process 0 prior to MsgA transmission (which is 0 in this example), and the NDI is not toggled, thus UE will perform retransmission of HAQR process 0 else if the NDI received is "1", meaning the NDI is toggled than UE will consider this is a scheduling of a new transmission.

In some embodiments, an NDI indication and the RV can be included in fallback RAR for 2-step CFRA case (using the reserved bits for TC-RNTI). Based on the NDI indicated, the UE may determine either to retransmit the MAC PDU in HARQ process 0 using the UL grant in fallback RAR or to generate a new MAC PDU for the UL grant in fallback RAR.

c. Considering UL Grant in Fallback RAR for New Transmission

In some embodiments, UE may consider the UL grant in fallback RAR as the UL grant for the new transmission of MsgA buffer (or Msg3 buffer). For example, RV 0 and HARQ process 0 may be used for transmission of MsgA payload (e.g., as defined in the protocol). Furthermore, if subsequent retransmission is to occur, the retransmission can be scheduled by PDCCH addressed to C-RNTI. In this case an initial value (0 or 1) may be used for the NDI of the new transmission of MsgA buffer (Msg3 buffer) scheduled by UL grant in fallback RAR for NDI comparison. The NDI value may be pre-defined in protocol or broadcasted in system information, or signaled by dedicated signaling or indicated in fallbackRAR (e.g. using the bits reserved for TC-RNTI).

In some embodiments, after retransmission of HARQ process 0 using the UL grant indicated in fallback RAR as described above, the UE may keep or maintain the HARQ buffer of corresponding HARQ process (e.g., HARQ process 0). Furthermore, if subsequent scheduling made on PDCCH addressed to C-RNTI for HARQ process used for MsgA transmission (e.g. HARQ process 0) is received after retransmission of MsgA PUSCH payload using the UL grant received in fallback RAR in responsive to MsgA transmission of the last RA attempt made on CFRA resources, the UE may compare the NDI value received in the PDCCH with the NDI value set for previous transmission of the same HARQ process prior to the MsgA transmission. If the NDI is toggled (i.e., differ from the previous NDI value), then the UE may perform new transmission of HARQ process 0 (e.g., transmission of new data in HARQ process 0) according to the scheduling configuration received in the PDCCH. Otherwise, if the NDI is not toggled (i.e., the same as previous NDI value), the UE may perform retransmission of HARQ process 0 according to the scheduling configuration received in the PDCCH.

For example, a scheduling of HARQ process 0 may be made with the NDI value set as "0", and after which UE initiate a 2-step RA type Random Access procedure using CFRA resource. After transmission of MsgA if the UE receives fallback RAR sent from network for scheduling MsgA PUSCH payload retransmission, the UE may transmit MsgA PUSCH payload in HARQ process 0 according to the UL grant indicated in fallback RAR. After which, if the NDI of subsequent scheduling of HARQ process 0 made on PDCCH addressed to C-RNTI is "0", UE may compare the NDI of the subsequent schedule with the NDI value of HARQ process 0 prior to MsgA transmission (which is 0 in this example), and the NDI is not toggled. The UE may perform retransmission of HARQ process 0 else if the NDI received is "1", meaning the NDI is toggled than UE will consider this is a scheduling of a new transmission.

In some embodiments, after the reception of fallback RAR in responsive of MsgA transmission made on CFRA resource, UE may continue the RA procedure, fallback to 4-step CBRA. This may be the same behavior as the fallback RAR received after the transmission of MsgA though 2-step CBRA resource.

II. Transmission or Retransmission of MsgA PUSCH Payload Through UL Grant Received on PDCCH for C-RNTI a. (Re)Transmission of MsgA Payload With Consideration of One Initial NDI Value In some embodiments, the UE may perform transmission or retransmission of MsgA PUSCH payload through UL grant received on PDCCH for the C-RNTI. If the previous uplink grant delivered to the HARQ entity for the same HARQ process was uplink grant determined for the contention free transmission of the MsgA, (e.g., as specified in the protocol) then value 0 (or value 1) may be used as the NDI value for the previous MsgA transmission for the NDI comparison. The NDI value may be pre-defined in protocol or broadcasted in system information, or signaled by dedicated signaling. In some embodiments, if the RA has completed and the last RA attempt was made on CFRA resource, the HARQ buffer used for transmission of the MAC PDU in the MSGA buffer (or Msg3 buffer) may be kept to allow UE performing HARQ retransmission.

In this case, the UE may determine whether this UL grant is for a new transmission or a retransmission by comparing the NDI value received in the PDCCH addressed to C-RNTI with the initial NDI value assigned for previous MsgA transmission. If the NDI received in the PDCCH scrambled by C-RNTI compared to the initial value of previous uplink grant is not toggled (e.g. is not changed), then they UE may identify that the PDCCH scrambled C-RNTI is a scheduling for retransmission, and UE may perform the retransmission of PUSCH payload based on the scheduling on PDCCH addressed to C-RNTI. Else if the NDI value received in the PDCCH is toggled (e.g. is changed), then UE will perform new transmission of HARQ process 0 (e.g., transmission of new data in HARQ process 0) according to the scheduling configuration indicated in the PDCCH.

In some embodiments, Once a UL grant indicated in PDCCH addressed to C-RNTI is received, and the previous transmission of the same HARQ process may be MsgA transmission through CFRA resource, one initial NDI value (0 or 1) may be considered for the previous MsgA transmission. The NDI value may be pre-defined in protocol or broadcasted in system information, or signaled by dedicated signaling. The UE may determine whether this UL grant received is scheduled for a new transmission, or a retransmission, by comparing the NDI value received in the PDCCH with the NDI value considered for previous transmission. If the NDI received in the PDCCH scrambled by C-RNTI compared to the initial value of previous uplink grant is not toggled (e.g. is not changed), then UE may identify the PDCCH scrambled by C-RNTI is a scheduling for retransmission, and UE may perform the retransmission of PUSCH payload based on the scheduling on PDCCH addressed to C-RNTI. Else, if the NDI is toggled (e.g., is changed), the UE may perform a new transmission of the scheduled HARQ process (e.g., transmit new data in the HARQ process) according to the scheduling configuration received in the PDCCH. In this case if the RA has completed and the last RA attempt was made on CFRA resource, the HARQ buffer used for transmission of the MAC PDU in the MsgA buffer (or Msg3 buffer) may be kept to allow UE performing HARQ retransmission.

b. (Re)Transmission of MsgA Payload With Consideration of Previous NDI Value

In some embodiments, if subsequent scheduling made on PDCCH addressed to C-RNTI for HARQ process 0 is received in responsive to MsgA transmission of the last RA attempt made on CFRA resources, the UE may compare the NDI value received in the PDCCH with the NDI value set for previous transmission of the same HARQ process prior to the MsgA transmission. If the NDI is toggled (i.e., differ from the previous NDI value), then UE may perform new transmission of HARQ process 0 (e.g., transmission of new data in HARQ process 0) according to the scheduling configuration received in the PDCCH. Else, if the NDI is not toggled (i.e., the same as previous NDI value), the UE may perform retransmission of HARQ process 0 according to the scheduling configuration received in the PDCCH. In this case, if the RA has completed and the last RA attempt was made on CFRA resource, the HARQ buffer used for transmission of the MAC PDU in the MSGA buffer (or Msg3 buffer) may be kept to allow UE performing HARQ retransmission.

For example, a scheduling of HARQ process 0 may be made with the NDI value set as "0", and after which the UE may initiate a 2-step RA type Random Access procedure using CFRA resource. After transmission of MsgA, UE may keep HARQ buffer used for transmission of the MAC PDU in MsgA buffer. if the NDI of subsequent scheduling of HARQ process 0 made on PDCCH addressed to C-RNTI is "0", the UE may compare the NDI of the subsequent scheduling with the NDI value of HARQ process 0 prior to MsgA transmission (which is 0 in this example), and the NDI is not toggled. The UE may perform retransmission of HARQ process 0 else if the NDI received is "1", meaning the NDI is toggled than UE will consider this is a scheduling of a new transmission, and may perform new transmission of HARQ process 0 (e.g., transmission of new data in HARQ process 0) according to scheduling configuration indicated in the PDCCH.

c. (Re)Transmission of MsgA Payload Independent of Whether the CFRA or CBRA Resource is Used In some embodiments, one initial value can be allocated for the NDI for the MsgA transmission, independent of whether the CFRA or CBRA resource is used for MsgA transmission. The initial value for the NDI can be "0" or "1". The NDI value may be pre-defined in protocol or broadcasted in system information, or signaled by dedicated signaling. If the previous uplink grant delivered to the HARQ entity for the same HARQ process was uplink grant determined as specified in the protocol for the contention free transmission of the MsgA or as specified in the protocol for the contention based transmission of MsgA, and C-RNTI is included in MsgA, one initial value may be used as the NDI for the previous MsgA transmission for NDI comparison. In this case if the RA has completed, the HARQ buffer used for transmission of the MAC PDU in the MSGA buffer or Msg3 buffer may be kept for UE to perform the retransmission.

Some examples in any combination detailed above can be used for MsgA PUSCH payload retransmission in case preamble is successfully decoded while the corresponding PUSCH payload is not.

C. Transmissions of MsgAs in RA Procedures

Figure 4:
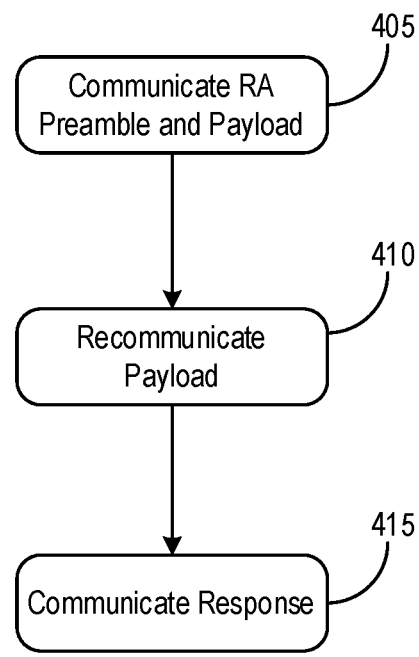
FIG. 4 illustrates a flow diagram of an example method of transmission of preamble and payload messages in random access (RA) procedures in accordance with an embodiment of the present disclosure.

Referring now to FIG. 4, depicted is a method 400 of transmitting MsgAs in RA procedures. The method 400 may be implemented or performed using any components described herein, such as the BS 102 or UE 104. In overview, the method 400 may include CFRA configuration and CBRA configuration as discussed above. The method 400 may include communicating a RA preamble and payload (405). The method 400 may include re-communicating the payload (410). The method 400 may include communicating a response (415).

The method 400 may include communicating a RA preamble and payload (405). A wireless communication device (e.g., UE 104) may send, provide, or transmit a random access (RA) preamble and a corresponding uplink channel payload to a wireless communication node (e.g., BS 102) in a RA procedure. The wireless communication node may in turn identify, obtain, or receive the RA preamble and the corresponding uplink channel payload form the wireless communication device in the RA procedure. The RA preamble may be generated in accordance with RA procedure, and the transmission resource for a preamble may include at least one of the following: transmission resource in time domain, transmission resource in frequency domain, a transmission resource in code domain, a format, or a mapping relation between the preamble and the payload transmission resources, among others. The uplink channel payload may contain or include at least one of the following: C-RNTI, UE identity, MAC CE, BSR, CCCH message, DCCC messages, PHR, MAC SDU from DRB, beam management related information, or other parameters that to be transmitted via the uplink channel. The transmission resource for uplink channel payload may include: a location of payload transmission resource in time-domain, of payload transmission in frequency, of payload transmission resource in code domain (e.g., orthogonal code, non-orthogonal code, or other code in physical layer), and bandwidth used for transmission, among others. The mapping relationship may include the following flexibilities: a preamble transmission resources located in different random access channel occasions (ROs) can be mapped to the same payload transmission occasion with different payload transmission code; different preambles within one RO can be mapped to different payload transmission occasions (with the same or different payload transmission code); multiple UE using different preambles can mapped the same payload transmission resources; the same payload transmission code within the same payload transmission occasion); one preamble resources (a combination of preamble and RO) can be mapped to multiple payload transmission code within one payload transmission occasion to enable the multi-layer data transmission (e.g. MIMO); and a timing offset between preamble transmission resources and payload transmission resources can be different for different preamble transmission resources (e.g. the same or next time slot), among others.

In some embodiments, the wireless communication device may establish a medium access control (MAC) protocol data unit (PDU) based on a MsgA buffer. The corresponding uplink channel payload may be based on the MsgA buffer. The MAC PDU may include a bit string aligned in length (e.g., multiple of 8 bits), such as one or more of: a common control channel (CCCH) message, a dedicated control channel (DCCH) message, MAC service data unit (SDU), and MAC-CE, a C-RNTI, an inactive RNTI (I-RNTI), UE-ID, buffer status report (BSR), a power headroom report (PDR), a beam measurement result, and a beam failure indication, among others. The MAC PDU may be established while in communication with the wireless communication node. Each MsgA may include the RA preamble and the corresponding uplink channel payload. In some embodiments, the wireless communication node may cause the wireless communication device to establish the MAC PDU based on the MsgA buffer. In some embodiments, the corresponding uplink channel payload may be in the MAC PDU.

In some embodiments, the wireless communication device may maintain (or keep) a hybrid automatic repeat request (HARQ) buffer from the transmission of the RA preamble and the corresponding uplink payload that is made on CFRA resource and it is the transmission of the last RA attempt. The HARQ buffer may include the MAC PDU. HARQ may be a combination of high-rate forward error-correcting coding with automatic repeat request (ARQ) error control. The HARQ buffer may maintain the corresponding uplink payload to be transmitted by applying the error-correcting coding. In some embodiments, the wireless communication node may cause the wireless communication device to maintain the HARQ buffer from the transmission of the RA preamble and the corresponding uplink payload that is made on CFRA resource and it is the transmission of the last RA attempt.

In some embodiments, the wireless communication device may identify, calculate, or determine an initial new data indicator (NDI) value for a new NDI of a transmission of the HARQ process occurring prior to the transmission of the RA preamble and the corresponding uplink channel payload to the wireless communication node that is made on CFRA resource and it is the transmission of the last RA attempt. The NDI may be used to define or identify whether the scheduling from the wireless communication node to the wireless communication device is for an initial transmission (e.g., a new transmission) or a retransmission. The wireless communication device may determine whether the scheduling information (e.g., PDCCH addressed to C-RNTI, UL grant in RAR, or UL grant in the fallback RAR) is for new transmission or retransmission based on comparing of the NDI value received in the scheduling information with an initial NDI value. The initial NDI value may be assigned the same HARQ process. Or the wireless communication device may determine whether the scheduling information (e.g., PDCCH addressed to C-RNTI, UL grant in RAR, or UL grant in the fallback RAR) is for new transmission or retransmission by comparing the NDI value received in the scheduling information with the previous NDI value used for the same HARQ process. If the NDI value is determined to be not toggled, then the scheduling received may be to require a retransmission. If the NDI value is determined to be togged, then the scheduling received may be to require a new transmission. The initial NDI value may be 0 or 1, and may be determined in accordance with a protocol (e.g., specifying the transmission of the payload via the uplink channel or RRC). In some embodiments, the wireless communication node may cause the wireless communication device to identify, calculate, or determine an initial new data indicator (NDI) value for the new NDI of a transmission of the HARQ process occurring prior to the transmission of the RA preamble and the corresponding uplink channel payload to the wireless communication node that is made on CFRA resource and it is the transmission of the last RA attempt.

In some embodiments, the wireless communication device that is to transmit the RA preamble and the corresponding uplink channel payload to the wireless communication node that is made on CFRA resource and it is the transmission of the last RA attempt may correspond to a new data indicator (NDI) with an initial value. The NDI may be used to define or identify whether the communication from the wireless communication device is an initial transmission. In some embodiments, the NDI may be set according to protocol. In some embodiments, the wireless communication node may receive the RA preamble and the corresponding uplink channel payload from the wireless communication node that is considered with the initial NDI value when the transmission of RA preamble and the corresponding uplink channel payload is made on CFRA resource and it is the transmission of the last RA attempt.

The method 400 may include recommunicating the payload (410). The wireless communication device may determine whether the initial transmission of the uplink channel payload is successful. The wireless communication may refrain from retransmission of the uplink channel upload, responsive to a success of the transmission uplink channel payload for the wireless communication node. Conversely, the wireless communication device may resend or retransmit the corresponding uplink channel upload through an uplink grant to the wireless communication node, responsive to a failure of the transmitted uplink channel payload for the wireless communication node. The uplink grant may correspond to a permission to transmit data via the uplink channel, such as the uplink channel payload. The wireless communication node may in turn re-receive the corresponding uplink channel upload through the uplink grant from the wireless communication device.

In some embodiments, the wireless communication device may resend or retransmit the corresponding uplink channel payload through the uplink grant corresponding to the NDI with the initial NDI value. The wireless communication node may re-receive the corresponding uplink channel payload through the uplink grant corresponding to the NDI with the initial NDI value. In some embodiments, the wireless communication node may transmit a download channel addressed to a cell radio network temporary identifier (C-RNTI) to the wireless communication device. The C-RNTI may include a current NDI value (e.g., 0 or 1). In some embodiments, the wireless communication device may retransmit the corresponding uplink channel payload through the uplink grant of the downlink channel address to the C-RNTI. In some embodiments, the uplink grant may be from the downlink channel addressed to the cell radio network temporary identifier (C-RNTI). The wireless communication device may in turn receive the download channel address the C-RNTI from the wireless communication node.

In some embodiments, the wireless communication device determine whether the retransmission of the uplink channel payload for the wireless communication node is successful or a failure according to whether the current NDI value differs from the initial NDI value (or previous NDI value) of the same HARQ process scheduled. Responsive to determination that the retransmission is successful, the wireless communication device may refrain from additional retransmissions, and may further perform new transmission if scheduled Otherwise, responsive to determination that the failure of the retransmission, the wireless communication device may retransmit the corresponding uplink channel as scheduled. In some embodiments, the wireless communication device may compare the current NDI value with the initial NDI value (or previous NDI value) of the same HARQ process scheduled. When the current NDI value matches the initial NDI value (or previous NDI value) of the same HARQ process scheduled, the wireless communication device may resend or retransmit the corresponding uplink channel payload that is buffered in a buffer of the HARQ process scheduled (e.g. HARQ process 0). Conversely, when the current NDI value differs from the initial NDI value, the wireless communication device may initiate a transmission based on a new scheduling of HARQ process scheduled (e.g. HARQ process 0).

In some embodiments, responsive to the determination of the failure of the retransmission, the wireless communication device may retransmit the corresponding uplink channel according to whether the NDI has changed in value relative to the initial NDI value (or previous NDI value) of the same HARQ process scheduled. In some embodiments, the wireless communication device may resend or retransmit, responsive to receive the uplink grant address to the C-RNTI and to the RA procedure identified as contention free RA (CFRA) procedure, the corresponding uplink channel. The retransmission of the corresponding uplink channel may be in accordance with whether the NDI has changed in value relative to the initial value (or previous NDI value) of the same HARQ process scheduled. When the NDI is unchanged in value relative to the initial value (or previous NDI value) of the same HARQ process scheduled, the wireless communication device may retransmit the corresponding uplink channel payload that is buffered in a buffer of HARQ process scheduled (e.g. HARQ process 0). Conversely, when the NDI is changed in value relative to the initial value (or previous NDI value) of the same HARQ process scheduled, the wireless communication device may initiate a transmission based on a new scheduling of HARQ process scheduled (e.g. HARQ process 0).

In some embodiments, the wireless communication device may resend or retransmit the corresponding uplink channel payload using the MAC PDU to the wireless communication device. For example, the wireless communication device may generate the MAC PDU to transmit the uplink channel payload to the wireless communication node. In some embodiments, the HARQ buffer may include the MAC PDU used to retransmit. The wireless communication device may resend or retransmit the corresponding uplink channel payload in the MAC PDU maintained in the HARQ buffer. In some embodiments, the wireless communication node may re-receive the corresponding uplink channel payload from the wireless communication device using the MAC PDU. In some embodiments, the wireless communication device may resend or retransmit the corresponding uplink channel payload only once to the wireless communication node. The wireless communication node may re-receive the corresponding uplink channel payload only once from the wireless communication device.

In some embodiments, the wireless communication device may resend or retransmit the corresponding uplink channel payload using a redundant version (RV) to the wireless communication node. The RV may correspond to a redundant copy of the payload to be retransmitted, and may be specified in accordance with a specification. In some embodiments, the wireless communication device may re-receive the corresponding uplink channel payload from the wireless communication device using the RV.

The method 400 may include communicating a response (415). In some embodiments, the wireless communication node may send, provide transmit a fallback RA response (RAR) (e.g., included in MsgB). In some embodiments, the wireless communication device may identify, retrieve, or receive a fallback RA response (RAR). The RAR may define or include the uplink grant to be used to retransmit the corresponding uplink channel payload. The RA procedure may include or is identified as a contention free RA (CFRA) procedure. In some embodiments, the fallback RAR may include RV to be used for retransmission of the corresponding uplink channel payload.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:
   transmitting, by a wireless communication device in a random access (RA) procedure, a RA preamble and a corresponding uplink channel payload to a wireless communication node;
   receiving, by the wireless communication device from the wireless communication node, a fallback RA response (RAR) including an uplink grant, a current new data indicator (NDI), and a redundant version (RV) for the corresponding uplink channel payload, wherein the RA procedure comprises a contention free RA (CFRA) procedure;
   comparing, by the wireless communication device, the current NDI value received in the fallback RAR with a previous NDI value;
   establishing, by the wireless communication device, a medium access control (MAC) protocol data unit (PDU) based on a MsgA buffer and the current NDI value, wherein the corresponding uplink channel payload is based on the MsgA buffer; and
   transmitting, by the wireless communication device to the wireless communication node, the corresponding uplink channel payload of the RA procedure using the MAC PDU through the uplink grant and the RV of the fallback RAR according to whether the current NDI value is different from the previous NDI value.

2. The method of claim 1, comprising retransmitting, by the wireless communication device to the wireless communication node, the corresponding uplink channel payload only once, wherein the uplink grant is from the fallback RAR.

3. The method of claim 1, comprising:
   determining, by the wireless communication node, whether the uplink grant is for a retransmission based on a comparison between the current NDI value received in the fallback RAR with the previous NDI value;
   performing, by the wireless communication device responsive to the current NDI value not matching the previous NDI value, a transmission according to a scheduling configuration in the fallback RAR; and
   retransmitting, by the wireless communication device responsive to the current NDI value matching the previous NDI value, the corresponding uplink channel payload based on the scheduling configuration on the fallback RAR.

4. The method of claim 3, comprising:
   when the current NDI value matches an initial NDI value, retransmitting, by the wireless communication device, the corresponding uplink channel payload that is buffered in a buffer of hybrid automatic repeat request (HARQ) process 0.

5. The method of claim 3, comprising:
   when the current NDI value differs from an initial NDI value, initiating, by the wireless communication device, a transmission based on a new scheduling of hybrid automatic repeat request (HARQ) process 0.

6. The method of claim 1, comprising:
   maintaining, by the wireless communication device, a hybrid automatic repeat request (HARQ) buffer from the transmitting of the RA preamble and the corresponding uplink channel payload, wherein the RA procedure comprises the CFRA procedure, and the HARQ buffer comprises the MAC PDU.

7. The method of claim 6, comprising retransmitting, by the wireless communication device to the wireless communication node, the corresponding uplink channel payload using a redundant version (RV), wherein the RV comprises a value indicated in the RAR.

8. The method of claim 6, comprising:
   transmitting, by the wireless communication device to the wireless communication node corresponding to the NDI with an initial value, the corresponding uplink channel payload in the MAC PDU.

9. The method of claim 8, comprising:
transmitting, by the wireless communication device responsive to failure of the retransmitted uplink channel payload for the wireless communication node, the corresponding uplink channel payload through the uplink grant of a downlink channel addressed to a cell radio network temporary identifier radio (C-RNTI).

10. The method of claim 8, comprising:
when the NDI is unchanged in value relative to the initial value, retransmitting, by the wireless communication device, the corresponding uplink channel payload that is buffered in a buffer of hybrid automatic repeat request (HARQ) process 0.

11. The method of claim 8, comprising:
when the NDI is changed in value relative to the initial value, initiating, by the wireless communication device, a transmission based on a new scheduling of hybrid automatic repeat request (HARQ) process 0.

12. The method of claim 1, comprising:
determining, by the wireless communication device, an NDI value as the previous NDI value of a transmission of a hybrid automatic repeat request (HARQ) process occurring prior to the transmitting of the RA preamble and the corresponding uplink channel payload to the wireless communication node in the same HARQ process;
receiving, by the wireless communication device from the wireless communication node, a downlink channel addressed to a cell radio network temporary identifier radio (C-RNTI) comprising the current NDI value; and
transmitting, by the wireless communication device responsive to a failure of the wireless communication node to receive the corresponding uplink channel payload, the corresponding uplink channel payload according to whether the current NDI value differs from the previous NDI value.

13. A method, comprising:
receiving, by a wireless communication node in a random access (RA) procedure, a RA preamble and a corresponding uplink channel payload from a wireless communication device;
transmitting, by the wireless communication node to the wireless communication device, a fallback RA response (RAR) including an uplink grant, a current new data indictor (NDI), and a redundant version (RV) for the corresponding uplink channel payload, wherein the RA procedure comprises a contention free RA (CFRA) procedure;
causing, by the wireless communication node, the wireless communication device to compare the current NDI value received in the fallback RAR with a previous NDI value;
causing, by the wireless communication node, the wireless communication device to establish a medium access control (MAC) protocol data unit (PDU) based on a MsgA buffer and the current NDI value, wherein the corresponding uplink channel payload is based on the MsgA buffer; and
receiving, by the wireless communication node from the wireless communication device, the corresponding uplink channel payload of the RA procedure through the uplink grant and the RV of the fallback RAR according to whether the current NDI value is different from the previous NDI value.

14. A wireless communication device, comprising:
at least one processor configured to:
transmit, via a transmitter, in a random access (RA) procedure, a RA preamble and a corresponding uplink channel payload to a wireless communication node;
receive, from the wireless communication node, a fallback RA response (RAR) including an uplink grant, a current new data indictor (NDI), and a redundant version (RV) for the corresponding uplink channel payload, wherein the RA procedure comprises a contention free RA (CFRA) procedure;
compare the current NDI value received in the fallback RAR with a previous NDI value;
establishing, by the wireless communication device, a medium access control (MAC) protocol data unit (PDU) based on a MsgA buffer and the current NDI value, wherein the corresponding uplink channel payload is based on the MsgA buffer; and
transmit, via the transmitter to the wireless communication node, the corresponding uplink channel payload of the RA procedure using the MAC PDU through the uplink grant and the RV of the fallback RAR according to whether the current NDI value is different from the previous NDI value.

15. A wireless communication node, comprising:
at least one processor configured to:
receive, via a receiver, in a random access (RA) procedure, a RA preamble and a corresponding uplink channel payload from a wireless communication device;
transmit, to the wireless communication device, a fallback RA response (RAR) including an uplink grant, a current new data indictor (NDI), and a redundant version (RV) for the corresponding uplink channel payload, wherein the RA procedure comprises a contention free RA (CFRA) procedure;
cause the wireless communication device to compare the current NDI value received in the fallback RAR with a previous NDI value;
cause the wireless communication device to establish a medium access control (MAC) protocol data unit (PDU) based on a MsgA buffer and the current NDI value, wherein the corresponding uplink channel payload is based on the MsgA buffer; and
receive, via the receiver from the wireless communication device, the corresponding uplink channel payload of the RA procedure using the MAC PDU through the uplink grant and the RV of the fallback RAR according to whether the current NDI value is different from the previous NDI value.

\* \* \* \* \*